United States Patent
Das et al.

(10) Patent No.: US 8,243,991 B2
(45) Date of Patent: Aug. 14, 2012

(54) METHOD AND APPARATUS FOR DETECTING TARGETS THROUGH TEMPORAL SCENE CHANGES

(75) Inventors: Subhodev Das, Princeton, NJ (US); Yi Tan, Bordentown, NJ (US); Ming-Yee Chiu, Princeton Junction, NJ (US); Andrew Coppock, Lawrenceville, NJ (US); Feng Han, Melville, NJ (US)

(73) Assignee: SRI International, Menlo Park, CA (US)

( * ) Notice: Subject to any disclaimer, the term of this patent is extended or adjusted under 35 U.S.C. 154(b) by 631 days.

(21) Appl. No.: 12/486,316

(22) Filed: Jun. 17, 2009

(65) Prior Publication Data

US 2010/0092036 A1  Apr. 15, 2010

Related U.S. Application Data

(60) Provisional application No. 61/073,212, filed on Jun. 17, 2008.

(51) Int. Cl.
    *G06K 9/00* (2006.01)
(52) U.S. Cl. ...................................... 382/103
(58) Field of Classification Search .............. 382/103, 382/107, 155, 156, 159, 165, 170, 172, 224, 382/294; 700/47, 57; 706/14, 15; 707/724, 707/725; 348/169
    See application file for complete search history.

(56) References Cited

U.S. PATENT DOCUMENTS

| | | | |
|---|---|---|---|
| 5,649,032 A | 7/1997 | Burt et al. | |
| 6,303,920 B1 * | 10/2001 | Wixson | 250/208.1 |
| 6,546,115 B1 | 4/2003 | Ito et al. | |
| 6,587,582 B1 * | 7/2003 | Nichani et al. | 382/149 |
| 6,731,799 B1 | 5/2004 | Sun et al. | |
| 6,999,600 B2 | 2/2006 | Venetianer et al. | |
| 7,184,890 B2 | 2/2007 | Boright et al. | |
| 7,377,323 B2 | 5/2008 | Walker et al. | |
| 7,876,938 B2 * | 1/2011 | Huang et al. | 382/128 |
| 2002/0051578 A1 * | 5/2002 | Imagawa et al. | 382/224 |
| 2005/0129299 A1 * | 6/2005 | Kreang-Arekul et al. | 382/132 |
| 2005/0232474 A1 * | 10/2005 | Wei et al. | 382/128 |
| 2006/0093209 A1 * | 5/2006 | Guetter et al. | 382/159 |
| 2008/0039706 A1 * | 2/2008 | Chefd'hotel et al. | 600/407 |

OTHER PUBLICATIONS

David Casasent et al., "Detection Filters and Algorithm Fusion for ATR," IEEE Transactions on Image Processing, IEEE New York, USA, vol. 6, No. 1, Jan. 1997, pp. 114-125.

(Continued)

*Primary Examiner* — Jason M Repko
*Assistant Examiner* — Shervin Nakhjavan
(74) *Attorney, Agent, or Firm* — Moser Taboada

(57) ABSTRACT

A system and method for detecting a target in imagery is disclosed. At least one image region exhibiting changes in at least intensity is detected from among at least a pair of aligned images. A distribution of changes in at least intensity inside the at least one image region is determined using an unsupervised learning method. The distribution of changes in at least intensity is used to identify pixels experiencing changes of interest. At least one target from the identified pixels is identified using a supervised learning method. The distribution of changes in at least intensity is a joint hue and intensity histogram when the pair of images pertain to color imagery. The distribution of changes in at least intensity is an intensity histogram when the pair of images pertain to grey-level imagery.

26 Claims, 12 Drawing Sheets

OTHER PUBLICATIONS

Salvador et al., "Shadow Identification and Classification Using Invariant Color Models", IEEE International Conference on Acoustics, Speech and Signal Processing, vol. 3, 2001, pp. 1545-1548.

Y. Shan et. al., "Learning Exemplar-Based Categorization for the Detection of Multi-View Multi-Pose Objects", Proc. Conf. Computer Vision and Pattern Recognition, pp. 1431-1438, 2006.

* cited by examiner

METHOD AND APPARATUS FOR DETECTING TARGETS THROUGH TEMPORAL SCENE CHANGES

CROSS-REFERENCE TO RELATED APPLICATIONS

This application claims the benefit of U.S. provisional patent application No. 61/073,212 filed Jun. 17, 2008, the disclosure of which is incorporated herein by reference in its entirety.

GOVERNMENT RIGHTS IN THIS INVENTION

This invention was made with U.S. government support under contract number HR0011-06-C-0018. The U.S. government has certain rights in this invention.

FIELD OF THE INVENTION

The present invention relates generally to computer vision systems, and more particularly, to a method and system for detecting targets in video and images based on temporal scene changes of the targets.

BACKGROUND OF THE INVENTION

In recent years, an active area of research has been foreground object detection. A common method for detecting foreground objects or objects of interest ("targets" in military jargon) in a sequence of time-ordered images/video is through change/anomaly detection in images/video (or "imagery"). Foreground object detection in a pair of time-ordered images has been an active area of research primarily because of its direct application in many intelligence, surveillance, and reconnaissance (ISR) tasks. Examples of ISR tasks include detection of threats and suspicious activities and the tracking of targets. Given the tactical nature of most ISR tasks, it is very important that a change detection system performs robustly—i.e., provide a high true detection rate, low false detection rate, and low missed detection rate in presence of clutter.

Table 1 lists the most common sources of clutter found in electro-optical (EO) imagery. Clutter can be overwhelmingly large as the field of regard increases, such as with newer large format aerial sensors covering a few to several square kilometers. As can be seen from Table 1, shadows are the greatest source of clutter. Therefore, the effective removal of shadows is of prime importance in the development and application of foreground object detection methods.

TABLE 1

| Typical sources of false alarms and their relative abundance in aerial EO imagery. | |
|---|---|
| Shadows | 95.0% |
| Local misregistration | 2.0% |
| Sensor anomalies | 1.0% |
| Local intensity changes | 1.0% |
| Pure parallax | 0.6% |
| Image defocus | 0.4% |
| Total false alarms | 100.0% |

Several prior art foreground object detection through change detection techniques employ a reference, such as a single prior image or a dynamically updating background model using video, as is described in U.S. Pat. Nos. 6,546, 115, 6,731,799, and 6,999,600. Background modelling is appropriate when one or more static cameras is employed for repeatedly viewing a relatively fixed scene. Unfortunately, a background model cannot be built when there is little overlap between one image and the next image, such as from airborne imagery. Other conventional object detection methods rely on matched filter type responses using stored templates, as described in "Detection Filters and Algorithm Fusion for ATR", by David Casasent et al., IEEE Transactions on Image Processing, IEEE New York, USA, vol. 6, No. 1, January 1997, pp. 114-125 (hereinafter "Casasent97"). The method described in Casasent97 relies on the generation and detection of digital signatures based on video images stored in a database and compared to signatures generated from the imagery under examination. The method described in Casasent97 is intolerant of the kinds of distortions that may be present in the video being examined due to variations in viewing geometry and distortions due to atmospheric conditions.

A typical approach for the removal of shadows in single spectral images involves a transformation of input color space in which shadows are restricted to single color channel as described in U.S. Pat. No. 7,366,323 and in Salvador et al., "Shadow Identification and Classification Using Invariant Color Models", IEEE International Conference on Acoustics, Speech and Signal Processing, vol. 3, 2001, pp. 1545-1548. However, image noise in transformed color space tends to be higher compared to that in the original image data. Multispectral image analysis techniques for shadow detection, such as described in U.S. Pat. No. 7,184,890, cannot be directly applied to single spectral images as these techniques exploit the characteristics of individual spectra in information integration.

The prior art generally relies on heuristics or static background/scene knowledge that render existing change-based target detection systems "brittle," i.e., such systems are likely to fail in an unexpected manner when deviations from the heuristics or background knowledge are large. To avoid large scale failure, most existing systems are operated in a restricted manner, such as during a specific time of the day.

Accordingly, what would be desirable, but has not yet been provided, is a method and system for detecting targets in imagery by analyzing the temporal changes affected by the targets.

SUMMARY OF THE INVENTION

The above-described problems are addressed and a technical solution achieved in the art by providing a method and system for detecting a target in imagery, the method being executed by at least one processor, comprising the steps of: detecting at least one image region exhibiting changes in at least intensity from among at least a pair of aligned images; determining a distribution of changes in at least intensity inside the at least one image region using an unsupervised learning method; using the distribution of changes in at least intensity to identify pixels experiencing changes of interest; and identifying at least one target from the identified pixels using a supervised learning method. The distribution of changes in at least intensity is a joint hue and intensity histogram when the pair of images pertain to color imagery and wherein the distribution of changes in at least intensity is an intensity histogram when the pair of images pertain to grey-level imagery.

According to an embodiment of the present invention, the step of aligning at least one set of pixels in pair of images further comprises the steps of: receiving at least a pair of images from a plurality of images taken by an image capturing device; selecting the pair of images from the plurality of images; finding at least one set of pixels in both images of the pair of images that represent the same object so that at least a portion of each of the pair of images overlap; and imposing a coarse-to-fine image registration procedure to bring the pair of images into alignment such that one of the images of the pair of images is warped to the other image of the pair of images at different levels of detail to align on at least one overlapping feature.

According to an embodiment of the present invention, the method further comprises the step of applying a change detection method to the aligned images to detect at least one image region exhibiting significant changes. The step of applying a change detection method to the aligned images may further comprise the step of computing a residual normal flow field between the aligned images to detect at least one image region exhibiting significant changes. The step of computing a residual normal flow field between the aligned images to detect at least one image region exhibiting significant changes may further comprise the steps of: color correcting a "before" image in the pair of images; deriving the normal flow field by obtaining a ratio of temporal and spatial image gradients at each pixel in an overlapping region of the aligned pair of images; flagging pixels exhibiting a higher value of the ratio when compared to a threshold as undergoing significant photometric change; extracting aggregates of the flagged pixels by applying a connected component labeling method; and applying domain knowledge about expected changes to filter out undesired change pixel blobs to obtain a significant change mask image.

According to an embodiment of the present invention, the step of determining a distribution of changes in at least intensity further comprises the steps of: obtaining hue and intensity values for each pixel in the aligned images; calculating differences in hue and intensity between the corresponding pixels in the aligned images; voting the differences into a histogram.

According to an embodiment of the present invention, the step of using the distribution of changes in at least intensity further comprises the steps of: filtering the histogram with a Gaussian kernel; estimating an effective spread of a resulting Gaussian distribution to determine an automatic threshold by searching around the dominant mode of the filtered histogram; generating a pair of binary masks that corresponds to a shadow distribution inside the dominant mode of the histogram; and applying each of the binary masks to the significant change mask image to apply change frequency thresholds to eliminate pixels undergoing frequent photometric changes and to leave pixels undergoing unusual changes. According to an embodiment of the present invention, the step of applying each of the binary masks further comprises the steps of: extracting blobs from joint distributions of changes in hue and intensity by examining each peak of the distribution and its neighborhood; discarding small blobs; and creating a pair of binary masks covering the remaining blobs.

According to an embodiment of the present invention, the step of identifying at least one target from the identified pixels using a supervised learning method further comprises the steps of: training a two-class classifier for at least one object type to distinguish between changes due to targets and objects that correspond to false alarms based on classification rules learned using positive and negative samples of objects of interest based on appearances, wherein the appearances are represented by feature vectors derived from image histogram of oriented gradients (HOG); feeding at least one object undergoing unusual changes to the trained classifier; and using at least one HOG feature vector to classify the at least one object as either the trained at least one object type or a false alarm. The two-class classifier may be a support vector machine (SVM).

BRIEF DESCRIPTION OF THE DRAWINGS

The present invention may be more readily understood from the detailed description of an exemplary embodiment presented below considered in conjunction with the attached drawings and in which like reference numerals refer to similar elements and in which.

It is to be understood that the attached drawings are for purposes of, illustrating the concepts of the invention and may not be to scale.

DETAILED DESCRIPTION OF THE INVENTION

Figure 1:
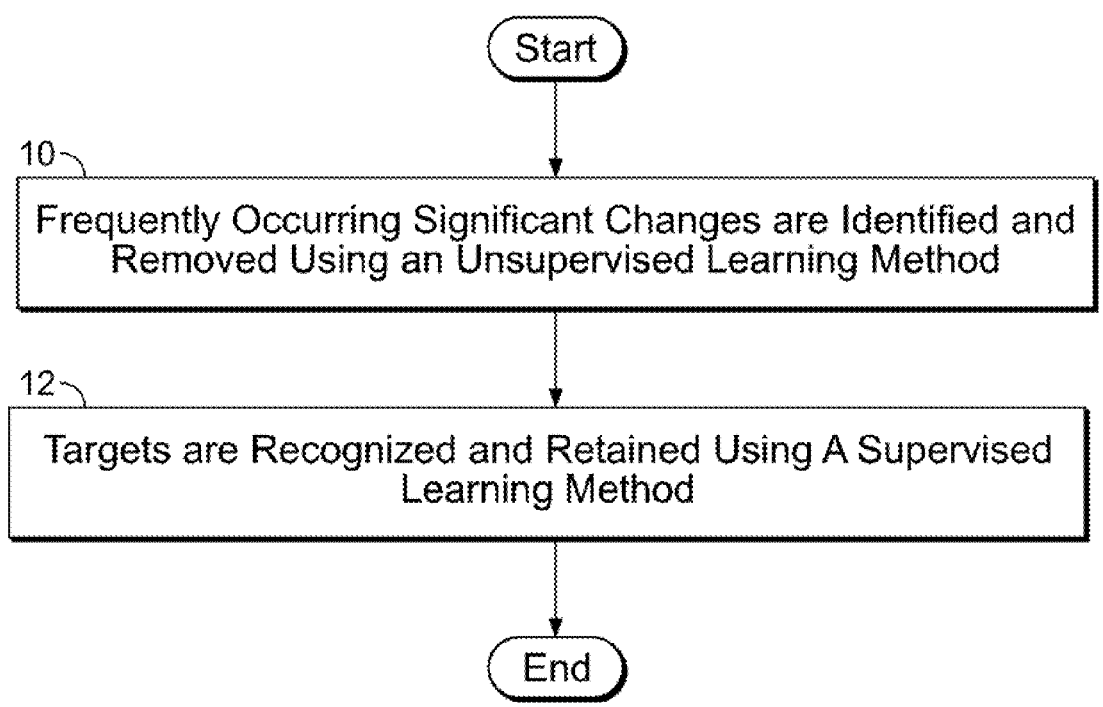
FIG. 1 is a high-level process flow diagram illustrating exemplary steps for detecting targets in imagery, according to an embodiment of the present invention.

FIG. 1 is a high-level process flow diagram illustrating exemplary steps for detecting targets in imagery, according to an embodiment of the present invention. At step 10, frequently occurring significant changes, such as due to shadows, are identified and removed using an unsupervised learning method. The unsupervised method "learns" to distinguish true changes from clutter in an unsupervised manner. At step 12, changes of interest are recognized and retained of using a supervised learning method. The supervised method learns to detect specific types of objects in a supervised manner.

As used herein, the term "supervised learning" refers to an entity that "teaches" what an object looks like, i.e., an entity or process that provides positive and negative samples of an object for training purposes. For example, a classifier may be trained to determine what a car looks like by providing positive samples of cars and negative samples of objects which are not cars. In an "unsupervised learning" setting, there is no entity providing positive and negative examples of an object. An entity type is learned through an automatic discovery process. Both methods learn the spatial, spectral and appearance characteristics of changes of interest and hence may be adapted to operate on color and grey-level imagery during both the day and night.

Moreover, certain embodiments of the present invention are not overly dependent on background knowledge for detecting objects of interest and even less so to the removal of false alarms. Most of the required information is gleaned through learning processes, hence, the present invention may be adapted to a variety of operating conditions, including the location and time of operation. Such capabilities have been demonstrated in field exercises—from early in the morning to late in the evening and under poor visibility.

Figure 2:
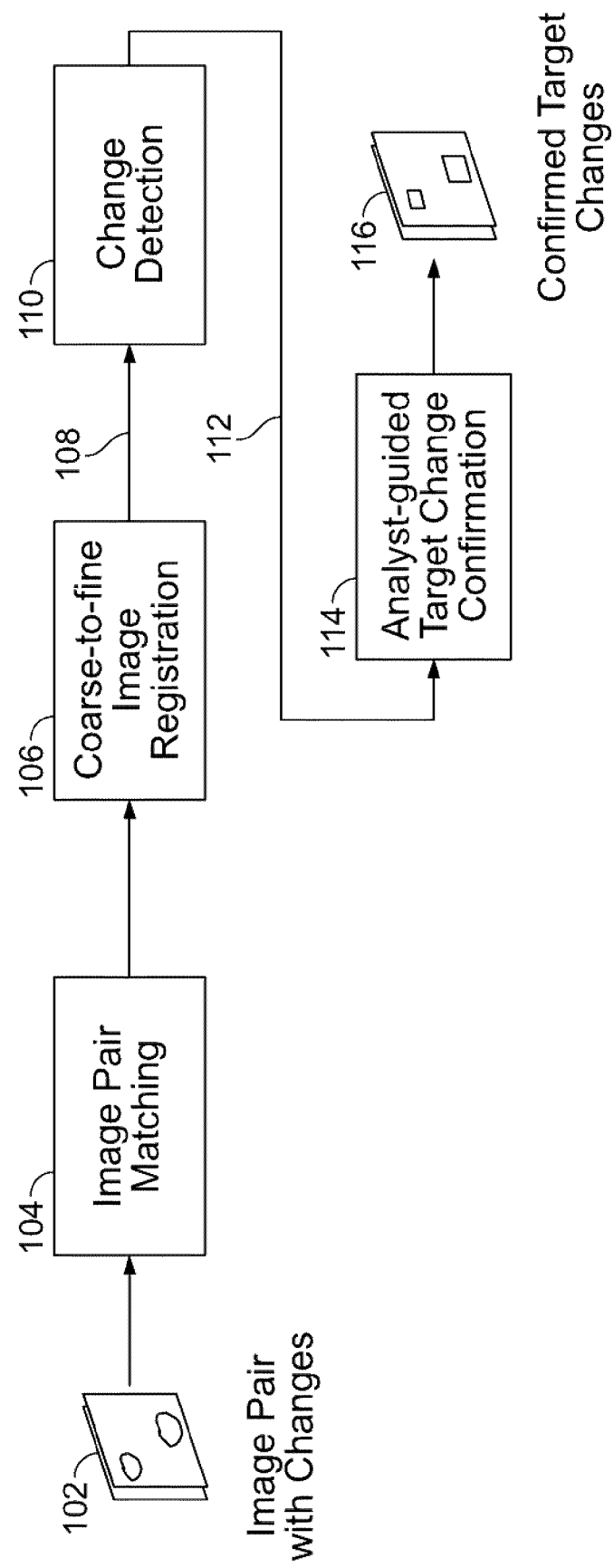
FIG. 2 is a combination block/process flow diagram illustrating exemplary pre- and post-processing steps for detecting targets in imagery, according to an embodiment of the present invention.

FIG. 2 is a combination block/process flow diagram illustrating exemplary pre- and post-processing steps for detecting targets in imagery, according to an embodiment of the present invention. The input to the system of the present invention is at least a pair of images 102 from a plurality of images taken by an image capturing device, such as, but not limited to, one or more video or still cameras operating in visible (electro-optical (EO)) range of wavelengths or in the infrared (IR) spectrum. The pair of images 102 may be separated in time over a wide range from milliseconds to on the order of days. An image pair matching step 104 selects the pair 102 from the plurality of images either manually (by an analyst) or automatically (e.g., based on image metadata derived from camera parameters) and finds at least one set of pixels in both images that represent the same object, i.e., at least some portion of each of the pair of images overlap. At step 106, a coarse-to-fine image registration procedure brings the pair of images into alignment. One of the images is warped to the other at different levels of detail to align on at least one overlapping feature to produce aligned image pair 108a, 108b. At step 110, a change detection algorithm determines sets of overlapping pixels corresponding (e.g., in position, intensity, hue, etc.) of targets undergoing temporal changes present in each of the aligned image pair 108a, 108b (i.e., the set of changes of interest 112). The change detection algorithm is described in more detail in connection with FIG. 3 hereinbelow. At step 114, at least one target of interest 116 is nominated as significant by an analyst from the set of changes of interest 112.

Figure 3:
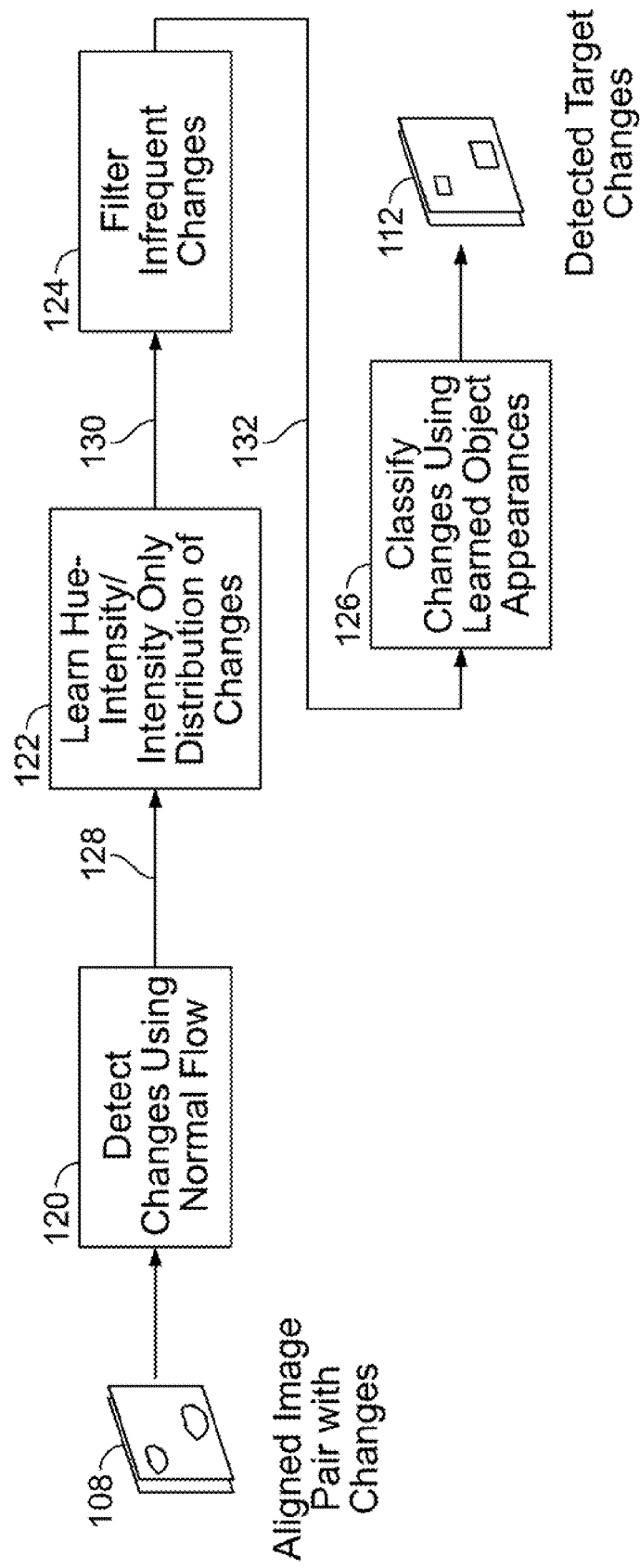
FIG. 3 is a combination block/process flow diagram illustrating exemplary processing steps for detecting temporal changes of targets in imagery, according to an embodiment of the present invention.

FIG. 3 is a combination block/process flow diagram illustrating exemplary processing steps for detecting temporal changes of targets in imagery, according to an embodiment of the present invention. According to an embodiment of the present invention, at step 120, image regions exhibiting significant changes (i.e., above a predetermined threshold) between two aligned images 108a, 108b are detected using a change detection method. In a preferred embodiment, the change detection method may be, but is not limited to, a computed normalized optical ("normal") flow field between the two aligned images. Embodiments of the present invention may implement the change detection method using normal flow, normalized correlation, background subtraction, etc. An exemplary description of a method for computing a normal flow field of changing objects in a pair of images is described in U.S. Pat. No. 5,649,032, which is incorporated herein by reference in its entirety. The output of step 120 represent significant changes between the aligned image pair 108 in the form of a significant change mask image 128. At step 122, joint distributions of changes in hue and intensity (for color images) or distributions of changes in intensity only (for grey-level images) inside change regions of the significant change mask image 128 are learned using an unsupervised learning method. The output of step 122 is an accumulated hue-intensity/intensity only histogram represented as a binary mask image 130 that, in step 124, may be placed over the significant change mask image 128 to apply change frequency thresholds to eliminate (filter) pixels undergoing frequent photometric changes (represented by hue-intensity/intensity) to leave pixels undergoing unusual changes. At step 126, the pixels corresponding to infrequently changing pixel regions are learned using a supervised learning method, i.e., from positive and negative examples of the entities. Step 126 includes (a) an off-line training process, and (b) an on-line testing (target recognition) process. The goal is to find learned targets in the pair of images from among sets of infrequently changing pixel regions.

Figure 4:
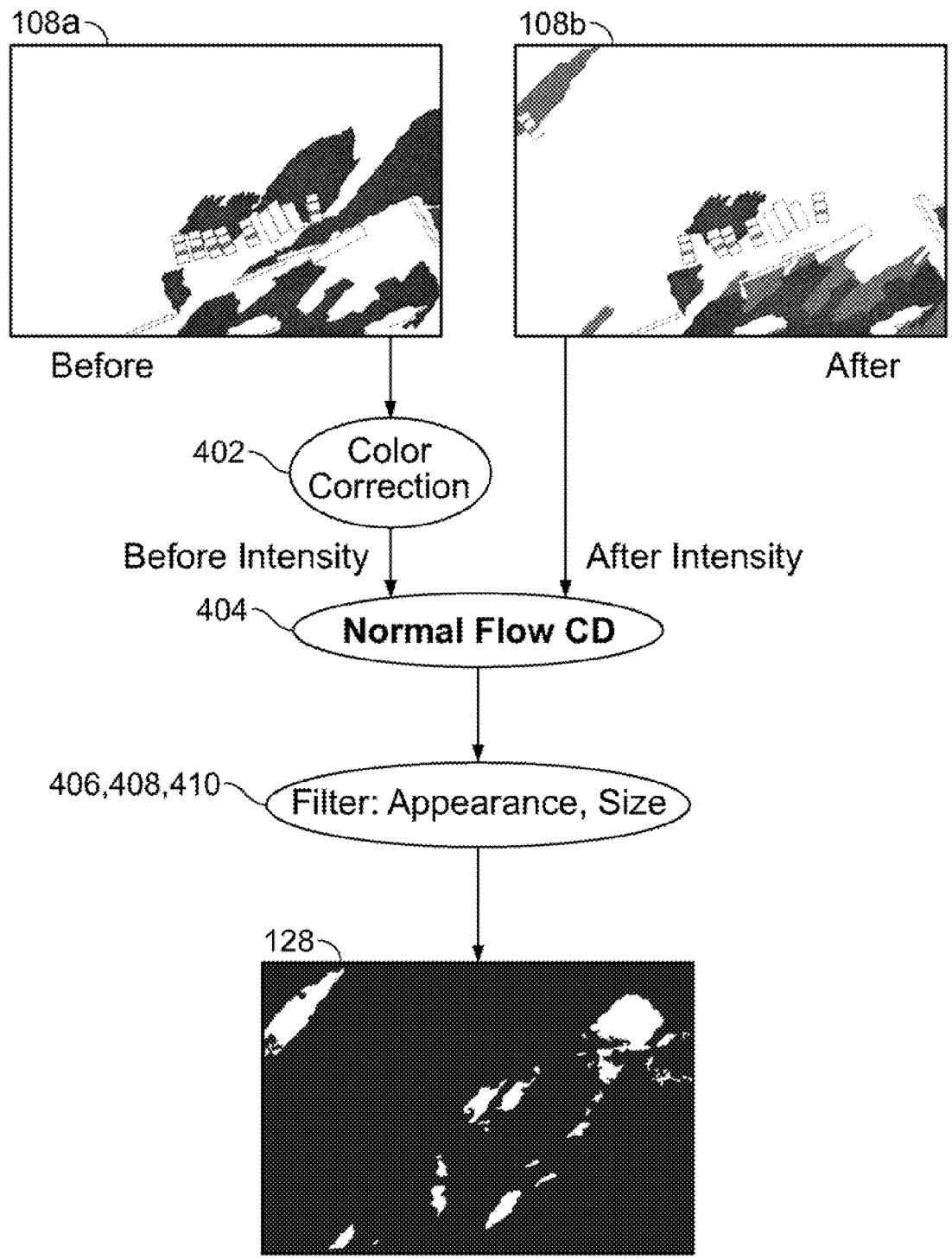
FIG. 4 is a combination block/flow diagram illustrating the significant change detection process step of FIG. 3 in greater detail, according to an embodiment of the present invention.

FIG. 4 is a combination block/flow diagram illustrating the significant change detection process step 120 in greater detail, according to an embodiment of the present invention. According to an embodiment of the present invention, after obtaining the pair of aligned image pair 108, the "before" image 108a may be color corrected in step 402. In step 404, a residual normal flow field is derived by obtaining the ratio of temporal and spatial image gradients at each pixel in the overlapping region of the aligned image pair 108. At step 406, pixels exhibiting a higher value of the ratio when compared to a threshold (user specified) are flagged as undergoing significant photometric change. At step 408, aggregates of such pixels are extracted by applying a connected component labeling method. At step 410, domain knowledge about expected changes is applied to filter out undesired change pixel blobs to obtain the significant change mask image 128.

The significant change detection process step 120 may be unable to distinguish between regions due to shadows and regions due to dark vehicles since the correspondence between the hue and the intensity values of a region is not preserved if histograms corresponding to hue and intensity are each created separately. To overcome this drawback, the unsupervised learning process 122 creates and utilizes a joint hue-intensity (H-I) histogram.

The significant change mask image 128 and the aligned image pair 108 provide the input to the unsupervised learning process 122. The role of the unsupervised learning process is to identify unlikely changes from among the significant changes found in step 120. The unsupervised learning process 122 builds and utilizes histograms of image hue (representing color) and intensity values to identify unlikely (i.e., low probability) changes. The use of hue-intensity histograms tends to eliminate changes due to low intensity pixel groups, such as shadows and dark vehicles.

Figure 5:
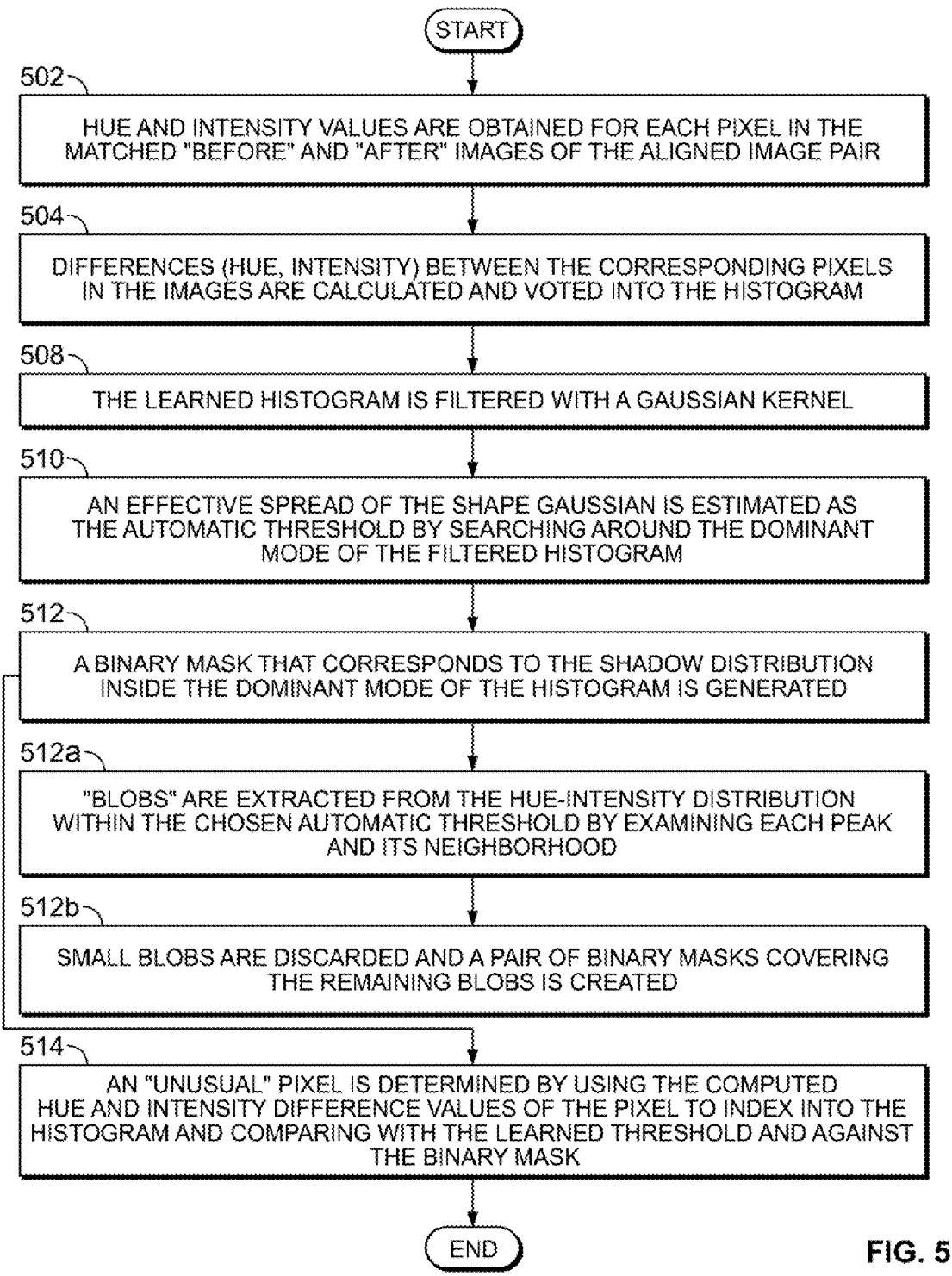
FIG. 5 is a combination block/flow diagram illustrating the unsupervised learning process step of FIG. 3 in greater detail, according to an embodiment of the present invention.

FIG. 5 is a combination block/flow diagram illustrating the unsupervised learning process 122 in greater detail, according to an embodiment of the present invention. During the unsupervised learning process 122, at step 502, hue and intensity values are obtained for each pixel $\{j, k\}$ in the matched "before" and "after" images 108a, 108b, respectively, of the aligned image pair 108 (note that (hue, intensity) are for color images. The same process of histogram accumulation to be described hereinbelow occurs with intensity values only for grey-level images). At step 504, differences ($\Delta$hue (504a), Δintensity (504b)) between the corresponding pixels in the matched "before" and "after" images 108a, 108b and within the change masks of image 128 are calculated and accumulated (504c) into the histogram bin {h, i}:

$$H(h, i) \sum_j \sum_k (\Delta hue = h, \Delta intensity = i)$$

A change pixel belonging to change mask image 128 is "unusual" if the difference hue (Δhue) and intensity (Δintensity) values corresponding to that pixel are such that $$H(\Delta hue, \Delta intensity) < H_{Threshold}$$

The H-I distribution of a learned histogram varies too greatly from scene to scene to permit a single threshold $H_{Threshold}$ to work effectively under all circumstances. Instead, the threshold is calculated automatically from the histogram distribution. In such circumstances, the threshold adapts to the unlikely changes in a scene. The method is based on the observation that the H-I distribution of a shadow region can be approximated by a 2D Gaussian (asymmetric) shape.

Figure 6:
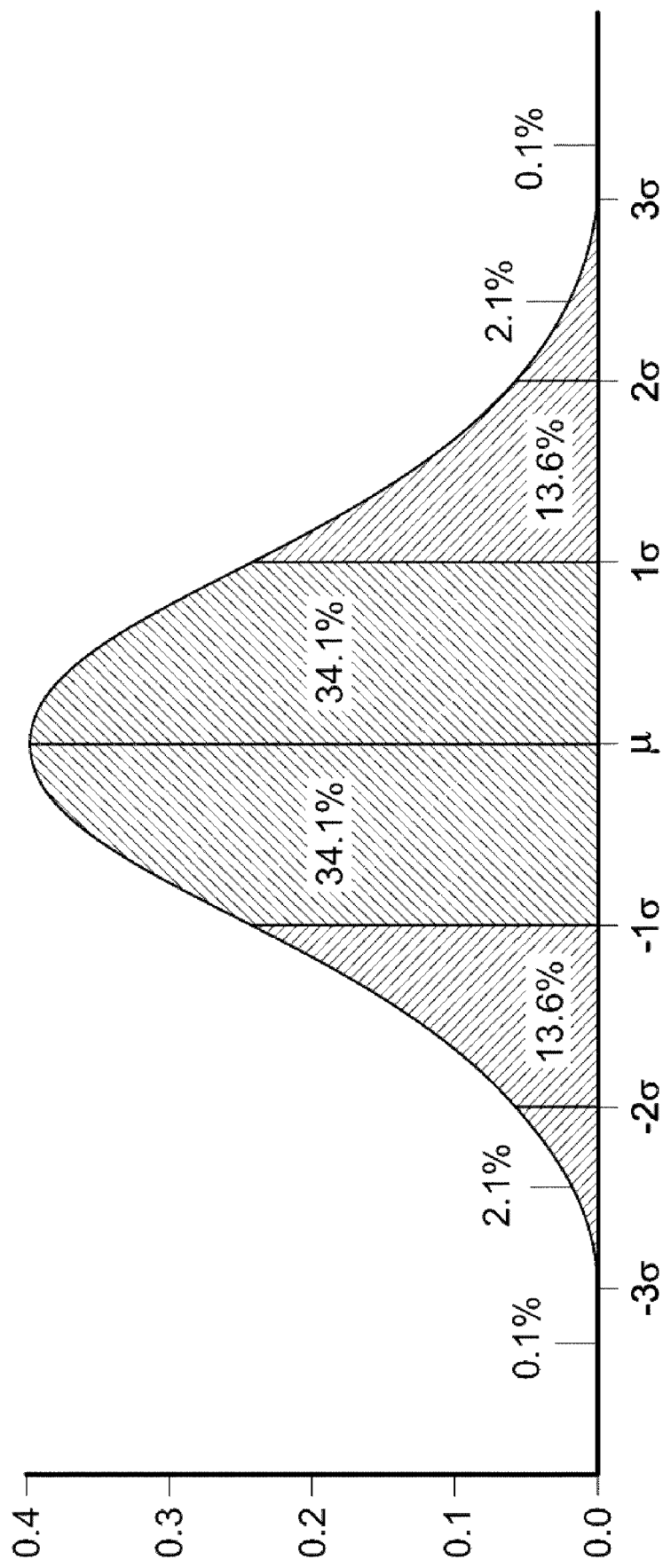
FIG. 6 illustrates a resulting Gaussian distribution obtained when a learned histogram is filtered with a Gaussian kernel, according to an embodiment of the present invention.

Automatic thresholding comprises the following steps: at step 508, the learned histogram is filtered with a Gaussian kernel. At step 510, an effective spread (1-, 2-, or 3-sigma) of the shape Gaussian is estimated as the automatic threshold by searching around the dominant mode of the filtered histogram. FIG. 6 illustrates threshold values at 1-, 2-, and 3-sigma of this Gaussian distribution to give 68.2%, 95.4% and 99.6% coverage, respectively, of the pixels of a region.

Once the threshold is determined, at step 512, a binary mask (pair) 130 that corresponds to the shadow distribution inside the dominant mode of the histogram is generated following these steps: At step 512a, "blobs" are extracted from the hue-intensity distribution within the chosen automatic threshold by examining each peak and its neighborhood. At step 512b, small blobs are discarded and a pair of binary masks 130 covering the remaining blobs is created.

During an "unusual" change detection step 514, the computed hue and intensity differences 504a, 504b at the corresponding pixels in the matched "before" and "after" images 108a, 108b and within the change masks of image 128 are indexed into the histogram accumulated at step 504c. Each indexed value is compared with the learned threshold $H_{Threshold}$ obtained at step 510 and against the binary masks of usual changes in H-I space obtained at step 512. If the indexed value is smaller than the threshold and is not covered by the masks, then the corresponding pixel is marked as exhibiting an "unusual" change.

Figure 7A:
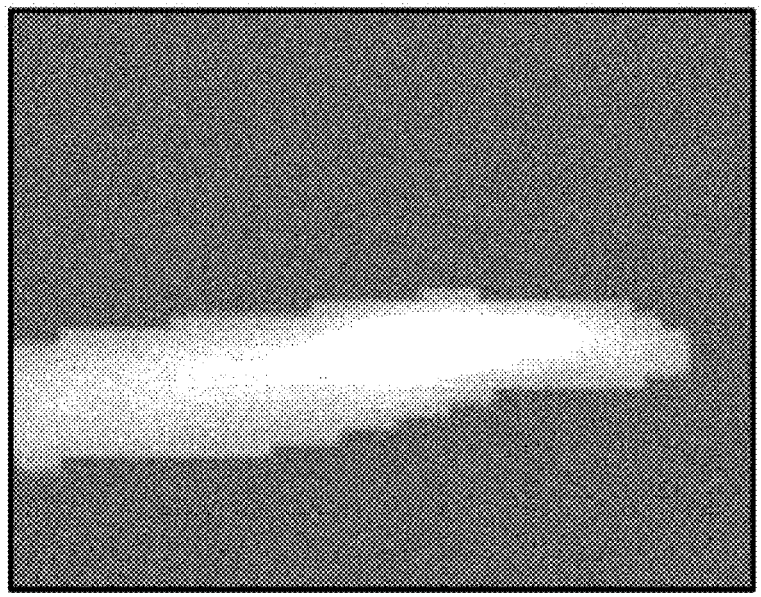
FIG. 7 illustrates shadow mask generation for a learned H-I distribution, according to an embodiment of the present invention.
Figure 7B:
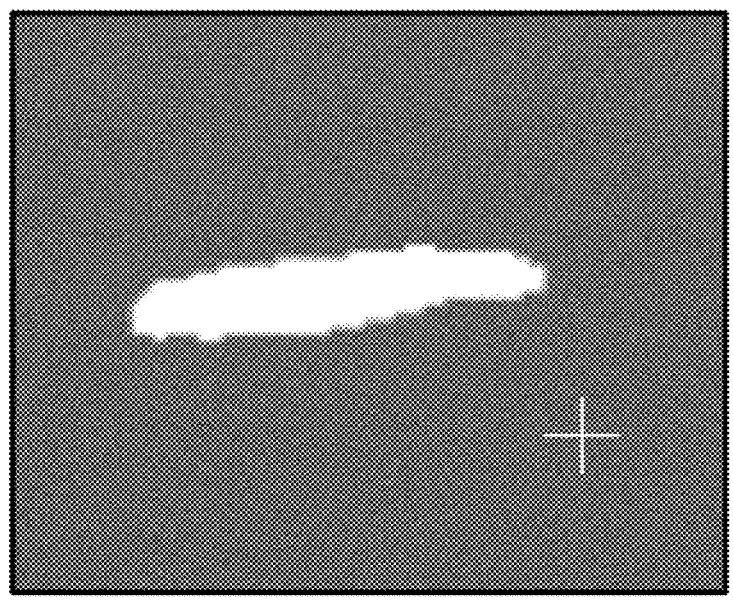

Two binary masks 130 are obtained for a typical learned H-I distribution—one corresponding to strong shadow (umbra) pixels and the other corresponding to soft shadow (penumbra) pixels. FIG. 7 illustrates shadow mask generation for a learned H-I distribution. FIG. 7a corresponds to the learned H-I distribution, while FIG. 7b is a corresponding mask.

In step 124 of FIG. 3, each of the binary masks 130 is applied to the significant change mask image 128 to apply change frequency thresholds to eliminate (filter) pixels undergoing frequent photometric changes (represented by hue-intensity/intensity) to leave pixels undergoing unusual changes. Any pixel whose hue and intensity belong to either one of the binary masks 130 is regarded as a "shadow" pixel and is excluded from an output image 132 representing pixels undergoing unusual changes.

Figure 8:
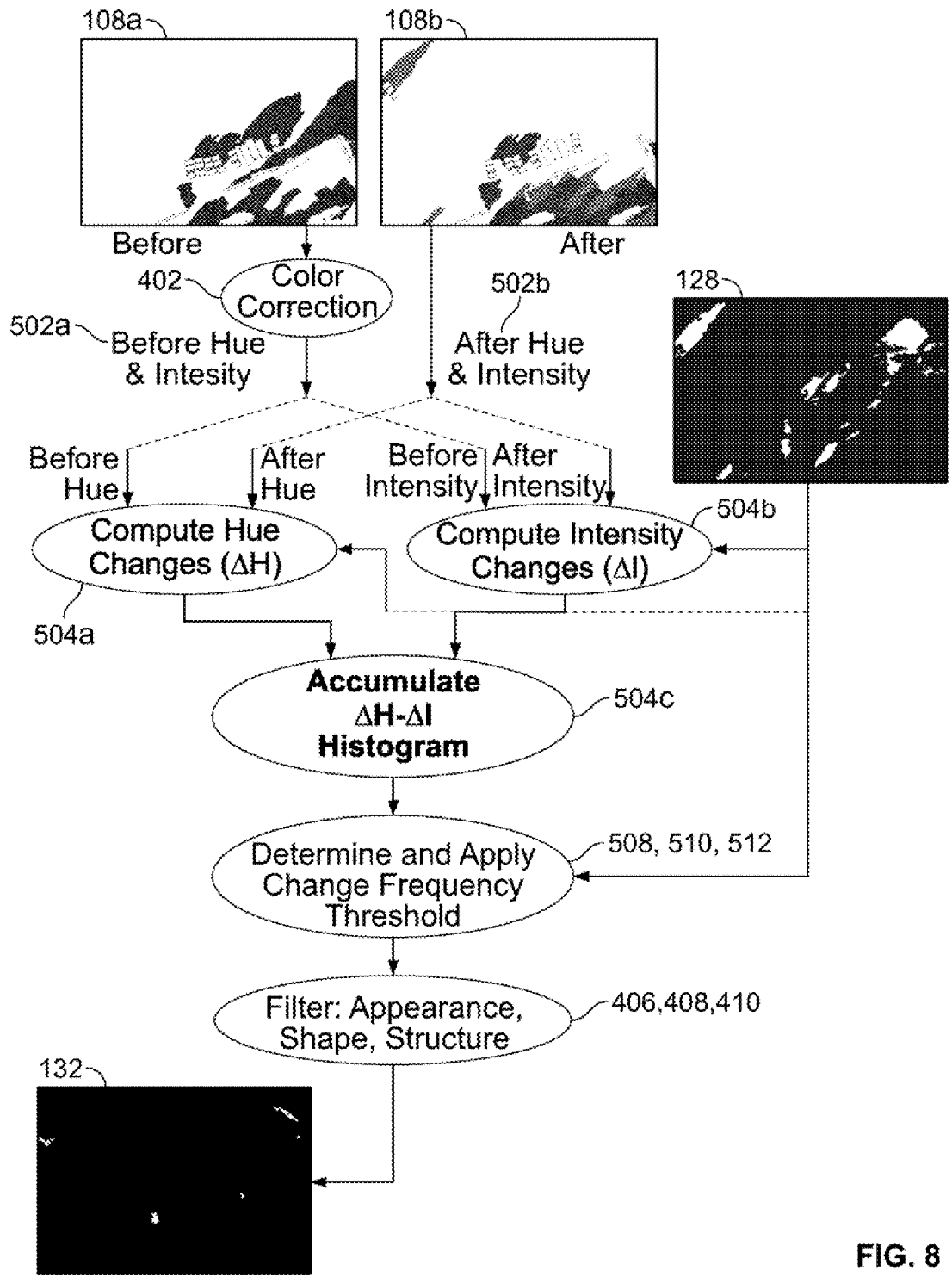
FIG. 8 illustrates the use of an unsupervised learning process via a learning joint H-I histogram to identify and eliminate frequently occurring changes, according to an embodiment of the present invention.

FIG. 8 illustrates the use of an unsupervised learning process via a learning joint H-I histogram to identify objects corresponding to pixels undergoing unusual changes. The pixels of the significant change mask image 128 obtained in FIG. 4 are subjected to the unsupervised learning process 122. The infrequent changes satisfying the domain knowledge about the appearance, shape and structural properties of the objects of interest (vehicles, in this example) are retained as the output image 132 representing pixels undergoing unusual changes.

Figure 9:
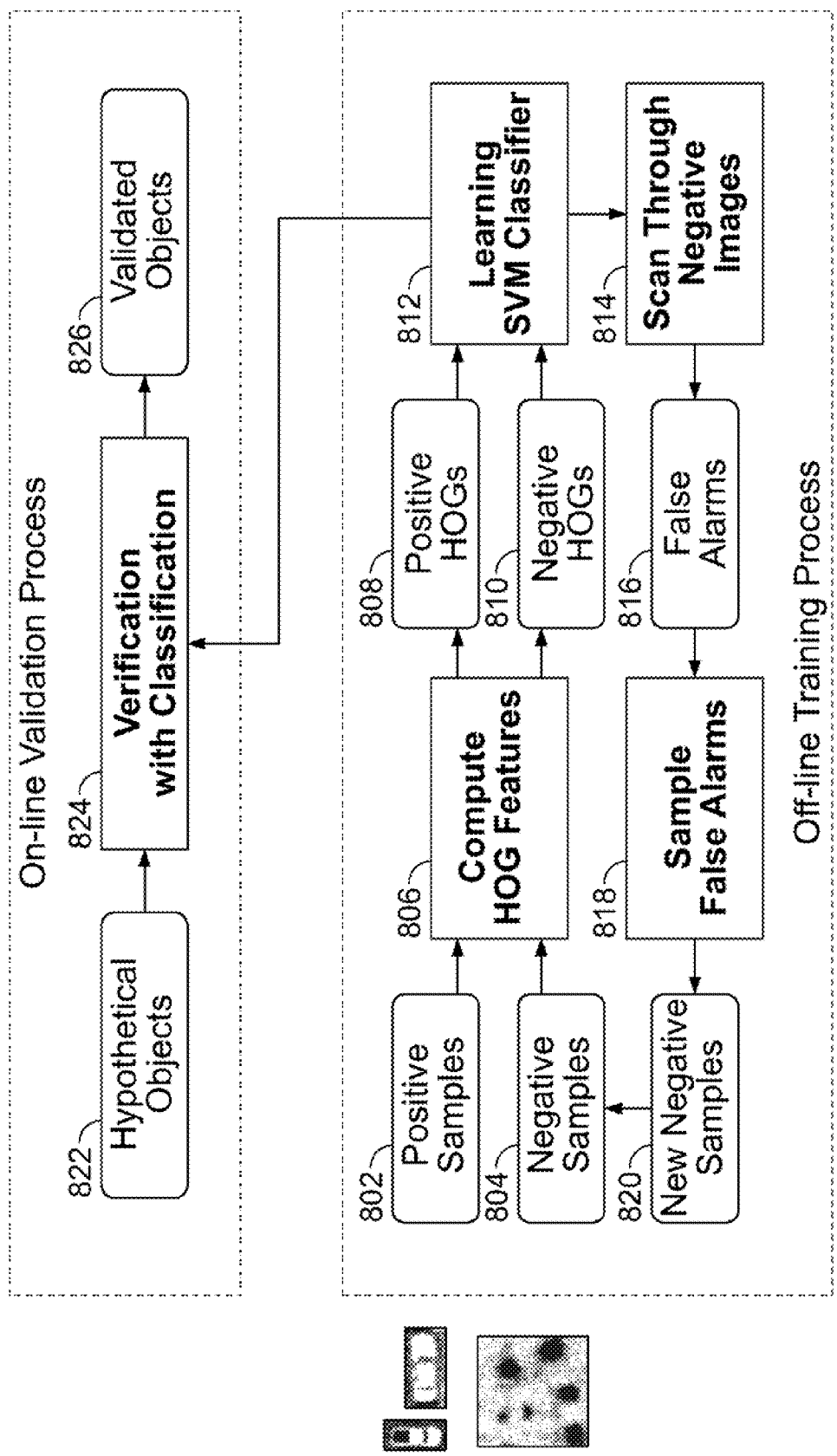
FIG. 9 illustrates a support vector machine (SVM) classifier trained to distinguish between changes due to target types of interest and false alarms, according to an embodiment of the present invention.

At step 126 of FIG. 3, pixels undergoing unusual changes in the output image 132 are classified based on a supervised learning method to reduce the detection of false alarms. Step 126 is divided into an on-line classification process and an off-line training process. In the off-line training process, a two-class classifier is trained to distinguish between changes due to a particular target type, such as vehicles, and others that may be false alarms, such as buildings. Note that one two-class classifier is implemented for one type of target. Thus, embodiments of the present invention may support a plurality of two-class classifiers, each trained for one type of target. FIG. 9 illustrates such a classifier realized using support vector machine (SVM). The classification is based on appearance, which is represented by image histogram of oriented gradients (HOG). As used herein, a HOG refers to feature descriptors used in computer vision and image processing for the purpose of object detection. The technique counts occurrences of gradient orientation in localized portions of an image. An exemplary HOG calculation method is described in Y. Shan et al., "Learning Exemplar-Based Categorization for the Detection of Multi-View Multi-Pose Objects", *Proc. Conf. Computer Vision and Pattern Recognition*, pp. 1431-1438, 2006, which is incorporated by reference herein in its entirety.

Figure 10B:
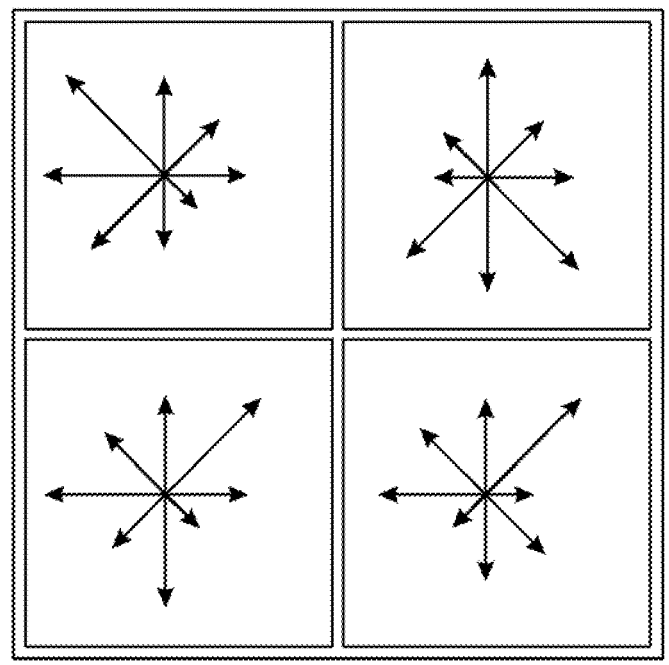
FIGS. 10A and 10B illustrate a notional description of histogram of oriented gradients (HOG)
Figure 10A:
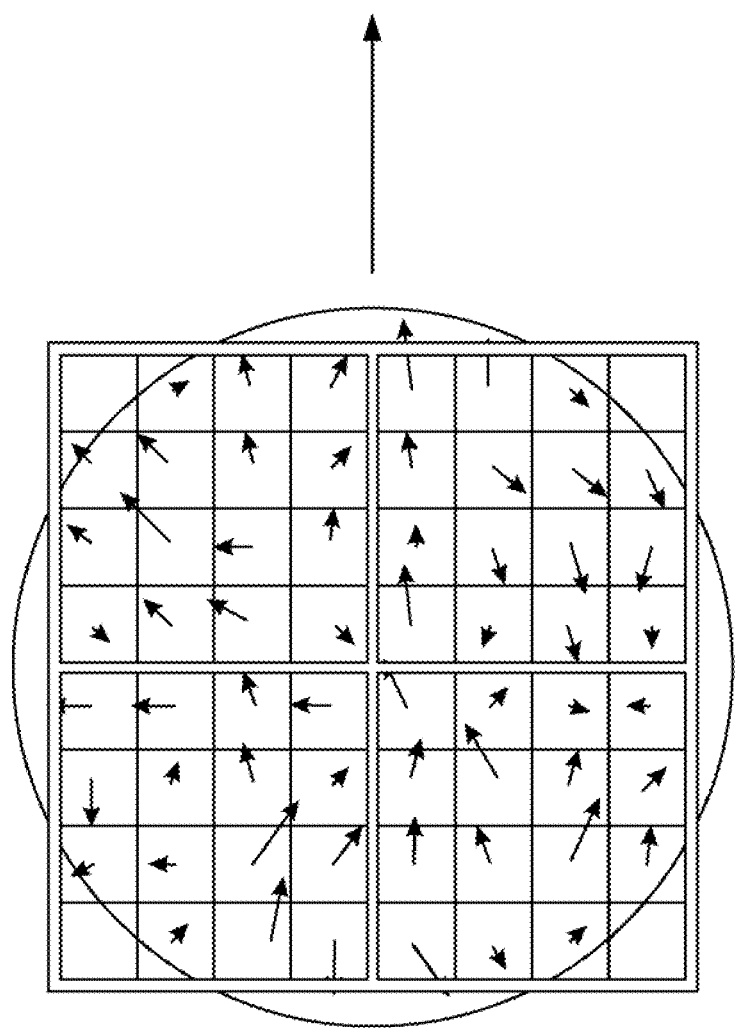

The classifier is trained off line using 50×50-pixel chips (i.e., a contiguous set of pixels of a portion of an image) of true changes representing positive samples 802 (e.g., due to vehicles) and false alarms representing negative samples 804 from a training data set of images. The positive and negative samples are used to compute HOG features 806. Referring now to FIGS. 9 and 10, each 50×50 chip is broken down into 25-16×16 (pixel) overlapping regions, each of which in turn is subdivided into 4 areas (see FIG. 10A). In each area, a HOG is calculated and the results are all concatenated to yield the chip's feature vector (see FIG. 10B). The positive and negative samples of HOG feature vectors 808, 810, respectively, are used by the SVM 812 to learn what distinguishes a vehicle from a typical false alarm. To render the training somewhat invariant to rotation, the positive samples 808 contain vehicle chips oriented horizontally and vertically. For additional rounds of training the SVM 812, additional images from the training data set of images are scanned for negative images 814 to rind images of false alarms 816. 50×50-pixel chips of sample false alarms 818 are derived from the false alarm images 816 to provide a new set of negative samples 820, which replace the original set of chips of negative samples 804. HOG positive and negative feature vectors are recalculated using the original positive samples 802 and the new negative samples 820 to further train the SVM 812. This process is repeated until the SVM 812 is sufficiently trained (i.e., the "state" of the classifier does not change between training rounds).

Figure 11:
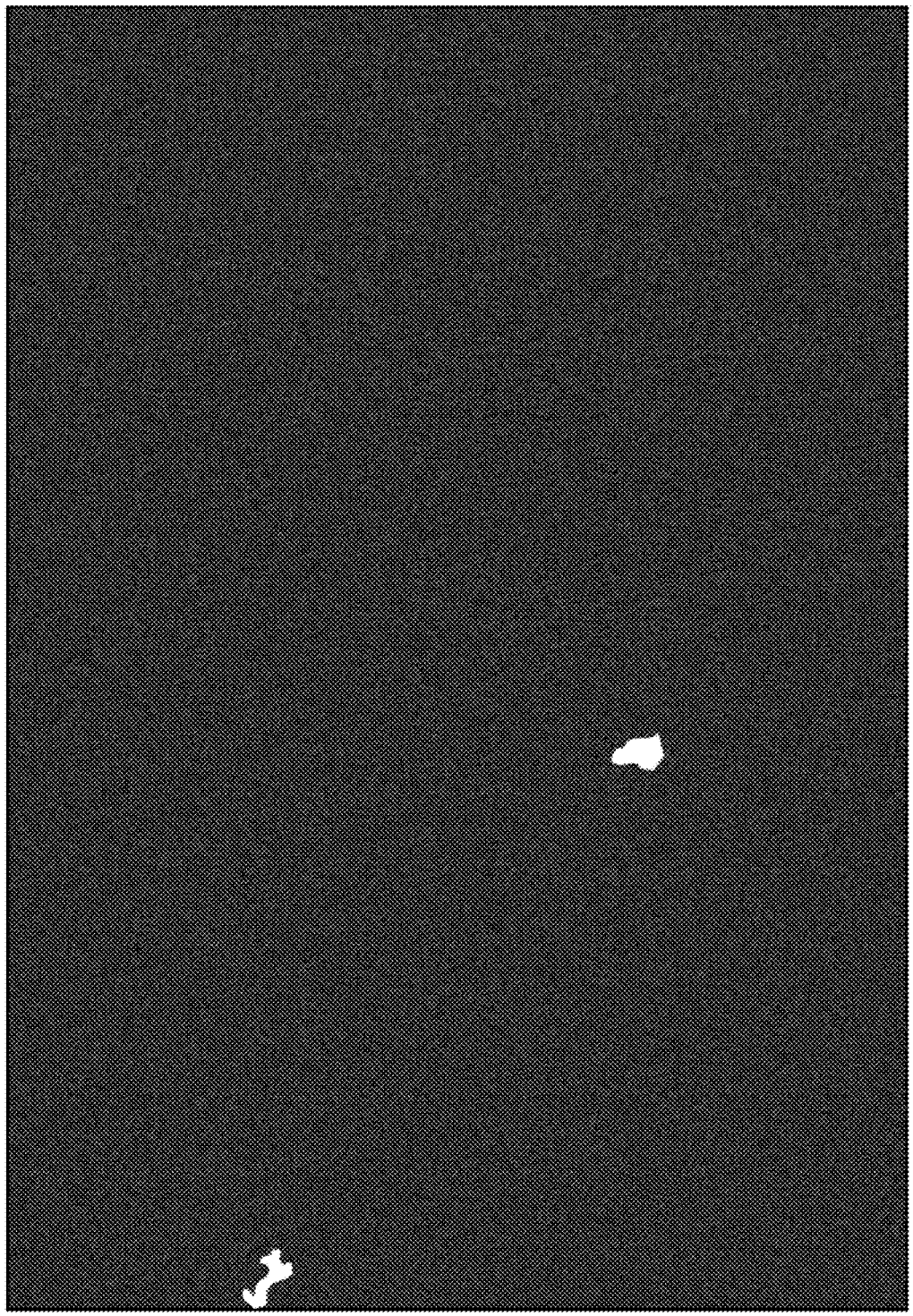
FIG. 11 shows a sample output image containing changes of interest due to vehicles after processing with a trained SVM classifier in an online classification process, according to an embodiment of the present invention.

During the on-line classification process, hypothetical objects 822 contained within the output image 132 representing pixels undergoing unusual changes are fed to a verification with classification block 824 containing the trained classifier (e.g., the trained SVM 812). Each candidate change region is scanned by the SVM with a 50×50 pixel window. A HOG feature vector is generated for each window and is classified as either the trained object type or a false alarm. Detected objects 826 due to temporal changes of interest are produced as the final output. A sample output image containing objects of interest due to vehicles is shown in FIG. 11.

Figure 12:
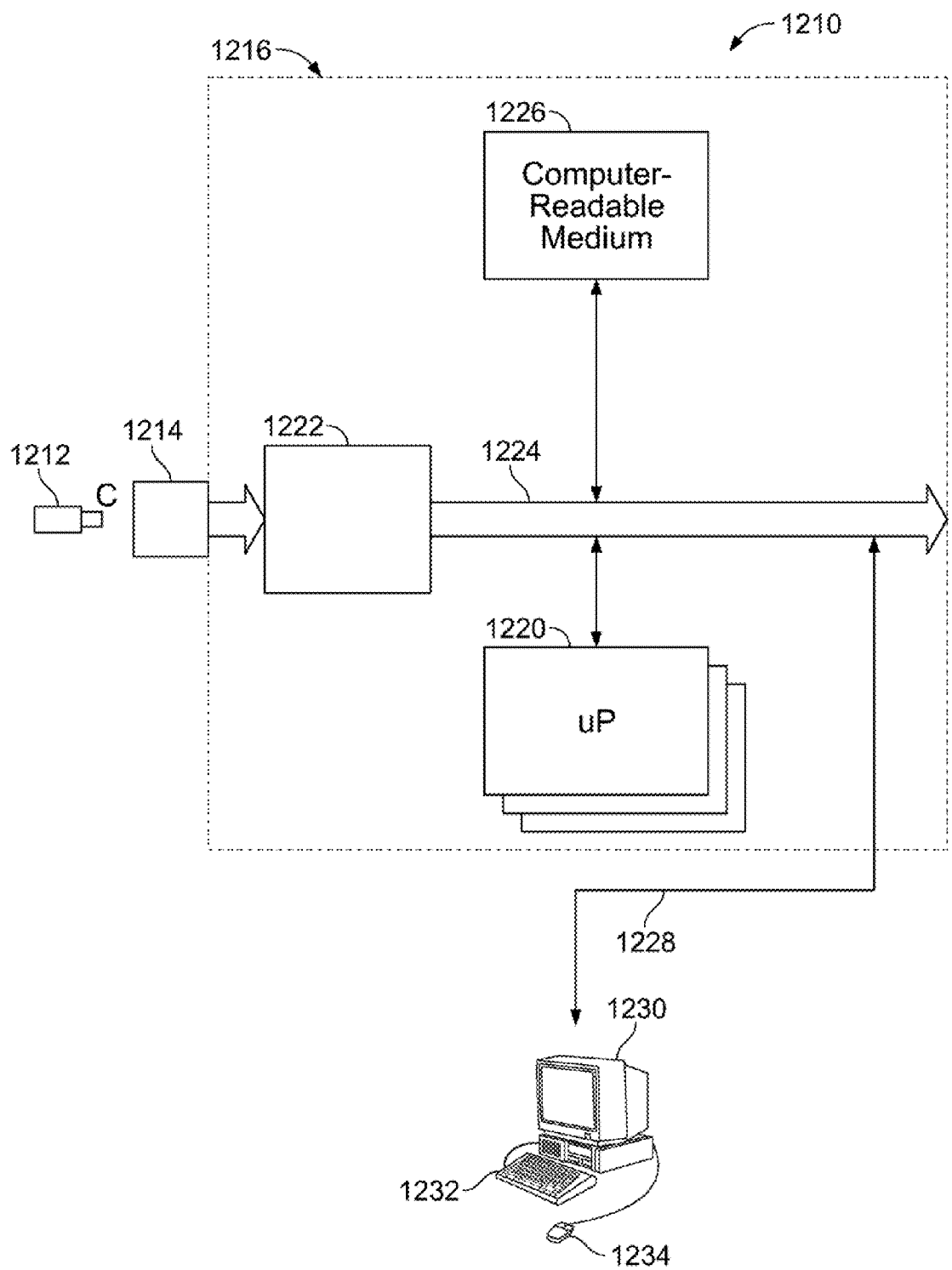
FIG. 12 shows a block diagram of a learning-based change detection system for detecting foreground objects of interest in video/imagery data, according to an embodiment of the present invention.

FIG. 12 depicts a learning-based change detection system for detecting objects of interest in imagery, according to an embodiment of the present invention. By way of a non-limiting example, the system 1210 receives digitized video or still images from one or more image capturing devices 1212, such as one or more still or video cameras, which, according to an embodiment of the present invention, may be rigidly mounted on an aerial platform. The system 1210 may also include a digital video capture system 1214 and a computing platform 1216. The digital video capturing system 1214 processes streams of digital video, or converts analog video to digital video, to a form which can be processed by the computing platform 1216. The digital video capturing system 1214 may be stand-alone hardware, or cards such as Firewire cards which can plug-in directly to the computing platform 1216. According to an embodiment of the present invention, the image capturing devices 1212 may interface with the video capturing system 1214/computing platform 1216 over a heterogeneous data link, such as a radio link (e.g, between an aircraft and a ground station) and digital data link (e.g, ethernet, between the ground station and the computing platform 1216). The computing platform 1216 may include a personal computer or work-station (e.g., a Pentium-M 1.8 GHz PC-104 or higher) comprising one or more processors 1220 which includes a bus system 1222 which is fed by video data streams 1224 via the one or more processors 1220 or directly to a computer-readable medium 1226. The computer readable medium 1226 may also be used for storing the instructions of the system 1210 to be executed by the one or more processors 1220, including an operating system, such as the Windows or the Linux operating system. The computer readable medium 1226 may further be used for the storing and retrieval of video clips of the present invention in one or more databases. The computer readable medium 1226 may include a combination of volatile memory, such as RAM memory, and non-volatile memory, such as flash memory, optical disk (s), and/or hard disk(s). Portions of a processed video data stream 1228 may be stored temporarily in the computer readable medium 1226 for later output to a monitor 1230. The monitor 1230 may display processed video data stream/still images. The monitor 1230 may be equipped with a keyboard 1232 and a mouse 1234 for selecting objects of interest by an analyst.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A computer-implemented method for detecting a target in imagery, the method being executed by at least one processor, comprising the steps of:
    detecting at least one image region exhibiting changes in at least intensity from among at least a pair of aligned images;
    determining a distribution of changes in at least intensity inside the at least one image region using an unsupervised learning method;
    using the distribution of changes in at least intensity to identify pixels experiencing changes of interest; and
    identifying at least one target from the identified pixels using a supervised learning method.

2. The method of claim 1, wherein the distribution of changes in at least intensity is a joint hue and intensity histogram when the pair of images pertain to color imagery and wherein the distribution of changes in at least intensity is an intensity histogram when the pair of images pertain to grey-level imagery.

3. The method of claim 1, further comprising the step of aligning at least one set of pixels in the pair of aligned images by:
    receiving a plurality of images taken by an image capturing device;
    selecting the pair of images from the plurality of images;
    finding at least one set of pixels in both images of the pair of images that represent the same object so that at least a portion of each of the pair of images overlap; and
    imposing a coarse-to-fine image registration procedure to bring the pair of images into alignment such that one of the images of the pair of images is warped to the other image of the pair of images at different levels of detail to align on at least one overlapping feature.

4. The method of claim 1, further comprising the step of applying a change detection method to the pair of aligned images to detect at least one image region exhibiting significant changes.

5. The method of claim 4, wherein the step of applying a change detection method comprises the step of computing a residual normal flow field between the pair of aligned images to detect at least one image region exhibiting significant changes.

6. The method of claim 5, wherein the step of computing a residual normal flow field between the pair of aligned images to detect at least one image region exhibiting significant changes further comprises the steps of:
    color correcting a before image in the pair of aligned images;
    deriving the normalized flow field by obtaining a ratio of temporal and spatial image gradients at each pixel in an overlapping region of the aligned pair of images;
    flagging pixels in an overlapping region of the aligned pair of images exhibiting a higher value of the ratio when compared to a threshold as undergoing significant photometric change;
    extracting aggregates of the flagged pixels by applying a connected component labeling method; and
    applying domain knowledge about expected changes to filter out undesired change pixel blobs to obtain a significant change mask image.

7. The method of claim 6, wherein the step of determining a distribution of changes in at least intensity further comprises the steps of:
    obtaining hue and intensity values for each pixel in the aligned images;
    calculating differences in hue and intensity between corresponding pixels in the aligned images;
    voting the differences into a histogram.

8. The method of claim 7, wherein the step of using the distribution of changes in at least intensity further comprises the steps of:
    filtering the histogram with a Gaussian kernel;
    estimating an effective spread of a resulting Gaussian distribution to determine an automatic threshold by searching around a dominant mode of the filtered histogram;
    generating a pair of binary masks that corresponds to a shadow distribution inside the dominant mode of the histogram; and applying each of the binary masks to a significant change mask image to apply change frequency thresholds to eliminate pixels undergoing frequent photometric changes and to leave pixels undergoing unusual changes.

9. The method of claim 8, wherein the step of applying each of the binary masks further comprises the steps of:
   extracting blobs from joint distributions of changes in hue and intensity by examining each peak of the distribution and its neighborhood;
   discarding small blobs; and
   creating a pair of binary masks covering the remaining blobs.

10. The method of claim 8, wherein the step of identifying at least one target from the identified pixels using a supervised learning method further comprises the steps of:
   training a two-class classifier for at least one object type to distinguish between changes due to targets and objects that correspond to false alarms based on classification rules learned using positive and negative samples of objects of interest based on appearances, wherein the appearances are represented by features vectors derived from image histogram of oriented gradients (HOG);
   feeding at least one object undergoing unusual changes to the trained classifier; and
   using at least one HOG feature vector to classify the at least one object as either the trained at least one object type or a false alarm.

11. The method of claim 10, wherein the two-class classifier is a support vector machine (SVM).

12. A non-transitory computer-readable medium storing computer code for detecting a target in imagery, the code being executed by at least one processor, wherein the computer code comprises:
   code for detecting at least one image region exhibiting changes in at least intensity from among at least a pair of aligned images;
   code for determining a distribution of changes in at least intensity inside the at least one image region using an unsupervised learning method;
   code for using the distribution of changes in at least intensity to identify pixels experiencing changes of interest; and
   code for identifying at least one target from the identified pixels using a supervised learning method.

13. The computer-readable medium of claim 12, wherein the distribution of changes in at least intensity is a joint hue and intensity histogram when the pair of aligned images pertain to color imagery and wherein the distribution of changes in at least intensity is an intensity histogram when the pair of aligned images pertain to grey-level imagery.

14. The computer-readable medium of claim 12, further comprising code for aligning at least one set of pixels in the pair of aligned images by executing:
   code for receiving a plurality of images taken by an image capturing device;
   code for selecting the pair of images from the plurality of images;
   code for finding at least one set of pixels in both images of the pair of images that represent the same object so that at least a portion of each of the pair of images overlap; and
   code for imposing a coarse-to-fine image registration procedure to bring the pair of images into alignment such that one of the images of the pair of images is warped to the other image of the pair of images at different levels of detail to align on at least one overlapping feature.

15. The computer-readable medium of claim 12, further comprising code for applying a change detection method to the pair of aligned images to detect at least one image region exhibiting significant changes.

16. The computer-readable medium of claim 15, wherein code for applying a change detection method comprises code for computing a residual normal flow field between the pair of aligned images to detect at least one image region exhibiting significant changes.

17. The computer-readable medium of claim 16, wherein code for computing a residual normal flow field between the pair of aligned images to detect at least one image region exhibiting significant changes further comprises:
   code for color correcting a before image in the pair of aligned images;
   code for deriving the normalized flow field by obtaining a ratio of temporal and spatial image gradients at each pixel in an overlapping region of the aligned pair of images;
   code for flagging pixels in an overlapping region of the aligned pair of images exhibiting a higher value of the ratio when compared to a threshold as undergoing significant photometric change;
   code for extracting aggregates of the flagged pixels by applying a connected component labeling method; and
   code for applying domain knowledge about expected changes to filter out undesired change pixel blobs to obtain a significant change mask image.

18. The computer-readable medium of claim 17, wherein code for determining a distribution of changes in at least intensity further comprises:
   code for obtaining hue and intensity values for each pixel in the aligned images;
   code for calculating differences in hue and intensity between corresponding pixels in the aligned images;
   code for voting the differences into a histogram.

19. The computer-readable medium of claim 18, wherein code for using the distribution of changes in at least intensity further comprises:
   code for filtering the histogram with a Gaussian kernel;
   code for estimating an effective spread of a resulting Gaussian distribution to determine an automatic threshold by searching around a dominant mode of the filtered histogram;
   code for generating a pair of binary masks that corresponds to a shadow distribution inside the dominant mode of the histogram; and
   code for applying each of the binary masks to a significant change mask image to apply change frequency thresholds to eliminate pixels undergoing frequent photometric changes and to leave pixels undergoing unusual changes.

20. The computer-readable medium of claim 19, wherein code for applying each of the binary masks further comprises:
   code for extracting blobs from joint distributions of changes in hue and intensity by examining each peak of the distribution and its neighborhood;
   code for discarding small blobs; and
   code for creating a pair of binary masks covering the remaining blobs.

21. The computer-readable medium of claim 19, wherein code for identifying at least one target from the identified pixels using a supervised learning method further comprises:
   code for training a two-class classifier for at least one object type to distinguish between changes due to targets and objects that correspond to false alarms based on classification rules learned using positive and negative samples of objects of interest based on appearances, wherein the appearances are represented by features vectors derived from image histogram of oriented gradients (HOG);

code for feeding at least one object undergoing unusual changes to the trained classifier; and code for using at least one HOG feature vector to classify the at least one object as either the trained at least one object type or a false alarm.

22. The computer-readable medium of claim 21, wherein the two-class classifier is a support vector machine (SVM).

23. A system for detecting a target in imagery, wherein at least a pair of images from a plurality of images is taken by an image capturing device, comprising:

a vision module configured for:
    detecting at least one image region exhibiting changes in at least intensity from among at least a pair of aligned images;

an unsupervised learning module for:
    determining a distribution of changes in at least intensity inside the at least one image region using an unsupervised learning method;
    using the distribution of changes in at least intensity to identify pixels experiencing changes of interest; and a supervised learning module identifying at least one target from the identified pixels using a supervised learning method.

24. The system of claim 23, wherein the distribution of changes in at least intensity is a joint hue and intensity histogram when the pair of images pertain to color imagery and wherein the distribution of changes in at least intensity is an intensity histogram when the pair of images pertain to grey-level imagery.

25. The system of claim 23, further comprising a normal flow module for computing a residual normal flow field between the pair of aligned images to detect at least one image region exhibiting significant changes.

26. The system of claim 23, wherein the vision module is configured to receive the at least the pair of images from the image capturing device mounted on an aerial platform, the system being one of collocated with the aerial platform and located on the ground separately from the image capturing device.

* * * * *